United States Patent [19]

Inoue et al.

[11] Patent Number: 5,606,605
[45] Date of Patent: Feb. 25, 1997

[54] REMOTE SUBSCRIBER CONTROL SYSTEM OF A CENTRAL OFFICE DIGITAL SWITCHING SYSTEM

[75] Inventors: Saburo Inoue; Yuzo Matsumoto, both of Kawasaki, Japan

[73] Assignee: Fujitsu Limited, Kanagawa, Japan

[21] Appl. No.: 972,005

[22] Filed: Nov. 5, 1992

[30] Foreign Application Priority Data

Nov. 7, 1991 [JP] Japan ................................. 3-291590

[51] Int. Cl.⁶ ...................................................... H04M 3/00
[52] U.S. Cl. ......................... 379/334; 370/384; 370/433
[58] Field of Search ................................ 379/333, 334, 379/93, 102, 32, 399, 412, 279; 370/110.1, 85.1, 85.3, 80, 81

[56] References Cited

U.S. PATENT DOCUMENTS

| | | | |
|---|---|---|---|
| 4,197,427 | 4/1980 | Hutcheson et al. | |
| 4,466,095 | 8/1984 | Kawano et al. | 370/63 |
| 4,571,721 | 2/1986 | Yasui et al. | 379/333 |
| 4,768,188 | 8/1988 | Barnhart et al. | 370/80 |
| 4,860,332 | 8/1989 | Chism | 379/6 |
| 5,046,067 | 9/1991 | Kimbrough | 370/110.1 |
| 5,133,006 | 7/1992 | Khuat | 370/399 |

FOREIGN PATENT DOCUMENTS 0048129  3/1982  European Pat. Off. .
59-070395  4/1984  Japan .
2083320  3/1982  United Kingdom .

*Primary Examiner*—Ahmad F. Matar

[57] ABSTRACT

A remote subscriber control system for controlling communications between remote subscriber terminals and a switch includes a remote subscriber transmitter coupled to a subscriber line interface, a switch side transmitter coupled to the switch and a digital transmission path connecting the remote subscriber side transmitter to the switch side transmitter. The remote subscriber side transmitter includes a state change detector for detecting whether or not a state of a remote subscriber terminal has changed, and a state memory for storing state information of the remote subscriber terminal. A dialing number memory stores a dialing number specifying a called terminal. A transmitter/receiver transmits state information and a dialing number, as subscriber control information, to the switch side transmitter and receives control orders from the switch. The switch side transmitter in turn includes an order receiver for receiving control orders from the switch, an output circuit for storing the control orders and outputting them in the same order in which they were received by the order receiver, and a transmitter/receiver for transmitting control orders to the remote subscriber side transmitter and receiving subscriber control information. A memory in the switch side transmitter stores the subscriber control information received by the transmitter/receiver of the switch side transmitter.

10 Claims, 9 Drawing Sheets

REMOTE SUBSCRIBER CONTROL SYSTEM OF A CENTRAL OFFICE DIGITAL SWITCHING SYSTEM

BACKGROUND OF THE INVENTION

1. Field of the invention

The present invention relates to a remote subscriber control system in a digital line switching system.

2. Description of related art

Recently, due to optical transmission technology, remote subscriber terminals located far away from a switching system can be accommodated by the switching system. Conventionally, there have been proposed two types of systems in which remote subscriber terminals located far from a switching system are accommodated thereby.

In the first type of system, remote subscriber terminals are accommodated by a switching system without interposition of software in a base station, as shown in FIG. 1. In FIG. 1, remote subscriber terminals 43 are connected by a transmitter/receiver (RT) 30 and a transmitter/receiver 20 of the remote switching system (CT) to a base station 10. The base station 10 includes a speech path network switch (NW) 1, a line concentrator (LC) 2 and a processor (CP) 3. The line concentrator 2 is connected to the switch 1 and the processor 3 controls both the switch 1 and the line concentrator 2. The switch side transmitter/receiver (CT) 20 is connected to the base station 10. The switch side transmitter/receiver 20 includes a switch side interface (IF) 21, a multiplexer/separator (MUX) 22 and an optical transmitter/receiver (O/E) 23. The multiplexer/separator 22 is connected to the line concentrator 2 of the base station 10. The remote subscriber side transmitter/receiver (RT) 30 is connected to the switch side transmitter/receiver 20 by an optical transmission/receiver 30 includes an optical transmitter/receiver (O/E) 31 and a multiplexer/separator 32. Subscriber line interface circuits (SLC) 42 are coupled to the multiplexer/separator 32 of the remote subscriber side transmitter/receiver 30 via a subscriber line interface (SLCIF) circuit 41. Each of the subscriber line interface circuits 42 is connected to one of subscriber terminals 43.

In this system as shown in FIG. 1, the line concentrator 2 of the base station 10 is coupled to the subscriber line interface circuits 42 via the optical transmission path 40. The time division multiplexing of subscriber speech signals and subscriber control signals is performed, so that the subscriber speech signals and the subscriber control signals are respectively transmitted in speech time slots and in control time slots via the optical transmission path 40. In a case where speech signals (V0, V1, ..., and Vn), control signals (SD/SCN0, SD/SCN1, ..., and SD/SCNn), a frame pulse and a clock signal as respectively shown in (a), (b), (c) and (d) of FIG. 2 are supplied from the base station 10 to the switch side transmitter/receiver 20, the multiplexer/separator 22 multiplexes the speech signals (V0, V1, ..., and Vn) and the control signals (SD/SCN0, SD/SCN1, ..., and SD/SCNn) in a format as shown in FIG. 3. The multiplexed signals are output from the optical transmitter/receiver 23 to the optical transmission path 40. In the remote subscriber side transmitter/receiver 30 receiving the multiplexed signals, the optical transmitter/receiver 31 inverts the received signals into electric signals, and separates the speech signals and the control signals from each other. The separated speech signals and the control signals are supplied to the subscriber line interface circuit 41. The subscriber line interface circuit 41 successively supplies the speech signals and the control signals to each of the corresponding subscriber line interface circuits 42. Each of the subscriber line interface circuits 42 supplies the speech signal and the control signal to a corresponding one of the subscriber terminals 43.

In the second type of system, as shown in FIG. 4, the line concentrator (LC) is provided at the remote subscriber side, and the line concentrator (LC) is coupled to the switch via either an optical transmission path or a PCM transmission path. Referring to FIG. 4, a base station 50 includes a network switch 1, processor 3 and a remote controller 4. The processor 3 controls both the network switch 1 and the remote controller 4. The switch side transmitter/receiver (CT) 20 coupled to the switching system 50 is provided with the interface 21, multiplexer 22 and optical transmitter/receiver 23. A remote subscriber side transmitter (RT) 60 is connected to the switch side transmitter/receiver 20 by the optical transmission path 40. The remote subscriber side transmitter 60 is provided with the optical transmitter/receiver 31, the multiplexer/separator 32, a line concentrator 33 and a processor 34. The processor 34 controls the line concentrator 33 in accordance with instructions supplied from the base station 50. The line concentrator 33 is coupled to the subscriber line interface circuits 42 via the subscriber line interface circuit 41. Each of the subscriber line interface circuits 42 is connected to a corresponding one of the subscriber terminals 43 by a cable.

In this system as shown in FIG. 4, the line concentrator 33 is provided at the remote subscriber side, and the line concentrator 33 is coupled to the switch 1 via either the optical transmission path 40 or the PCM transmission path. The local connection of the remote subscriber terminals 43 is controlled by the processor 34 provided in the remote subscriber side transmitter 60, the processor 3 of the base station 50 controls the remote subscriber terminals 43 in response to transmit calls.

In the former, first type of system, as the speech signals are multiplexed in accordance to a predetermined format, and are transmitted between the line interface subscriber circuits 42 and the line concentrator 2, the remote subscriber terminals can be accommodated by the switch 1 without the interposition of softwares in the base station. However, as both the subscriber speech signals and the control signals must be transmitted via the optical transmission path under a condition in which the subscriber speech signals and the control signals correspond to each other, a transmission format of signals in the optical transmission path 40 is restricted. Further, time slots for the control signals and the speech signals in the transmission format are fixed. Thus, even if remote subscriber terminals are in a no calling state, control signals must be transmitted, in the time slots for the control signals, to the remote subscriber terminals in the no calling state. Thus, the optical transmission path 40 is not effectively used for data transmission.

In the later, second type of system, as the line concentrator 33 and the processor 34 for controlling the line concentrator 33 are provided at the remote subscriber side, the distribution of speech signals to the remote subscriber terminals can be controlled by the processor 34. Thus, speech signals can be transmitted in arbitrary time slots, so that the time slots can be effectively used for transmitting the speech signals in the optical transmission path 40. However, software used by the processor 34 is needed in order to control the distribution of speech signals to the remote subscriber terminals. The software must be used in cooperation with software used in the base station 50. Thus, in a case where new functions for communication are added to the system, the software must be updated. In addition, control information must be transmitted from the base station 50 to the processor 34 in order to use the software. That is, a control path through which control information is transmitted must be provided in the optical transmission path 40. As a result, the subscriber call traffic is limited by the performance of the control path.

SUMMARY OF THE INVENTION

Accordingly, a general object of the present invention is to provide a remote subscriber control system in which the disadvantages of the aforementioned prior art are eliminated.

A more specific object of the present invention is to provide a remote subscriber control system in which remote subscriber terminals can be effectively controlled.

Another object of the present invention is to provide a remote subscriber control system in which function for communication can be economically changed.

The above objects of the present invention are achieved by a remote subscriber control system, provided between a switch and a subscriber line interface coupled to a plurality of remote subscriber terminals, for controlling communication between the remote subscriber terminals and the switch, the remote subscriber control system comprising a remote subscriber transmitter coupled to the subscriber line interface, a switch side transmitter coupled to the switch, and a digital transmission path connecting the remote subscriber transmitter to the switch side transmitter so that multiplexed signals including speech signals and control signals are transmitted through the digital transmission path, wherein the remote subscriber side transmitter comprises state change detection means for detecting whether or not a state of each remote subscriber terminal has changed; state information storage means for storing state information indicating a state of each remote subscriber terminal when the state change detection means detects that a state of each remote subscriber terminal has changed; dialing number storage means for storing a dialing number specifying a called terminal; transmitter/receiver means for transmitting state information stored in the state information storage means and a dialing number stored in the dialing number storage means, as subscriber control information, to the switch side transmitter via the digital transmission path and for receiving control orders supplied from the switch side transmitter via the digital transmission path, each control order being information for controlling one of the remote subscriber terminals; and order output means for outputting a control order, received by the transmitter/receiver means, to the subscriber line interface; and wherein the switch side transmitter comprises order receiving means for receiving control orders supplied from the switch; output means for storing the control orders received by the order receiving means and for outputting the control orders in order of receipt by the order receiving means; transmitter/receiver means for transmitting control orders, output from the output means, to the remote subscriber side transmitter via the digital transmission path and for receiving subscriber control information supplied from the remote subscriber side transmitter via the digital transmission path; and storage means for storing subscriber control information received by the transmitter/receiver means, the subscriber control information stored in the storage means being supplied to a processor of the switch, the processor generating control orders based on the subscriber information.

According to the present invention, the communication between the remote subscriber terminals and the switch is controlled based on a state of each of the remote subscriber terminals as determined when it has been detected that a state of each of the remote subscriber terminals has changed. In addition, the control signals can be transmitted via the digital transmission path under a condition in which the control signals do not correspond to speech signals. Thus, the communication between the remote subscriber terminals and the switch can be effectively controlled.

Additional objects, features and advantages of the present invention will become apparent from the following detailed description when read in conjunction with the accompanying drawings.

DESCRIPTION OF THE PREFERRED EMBODIMENTS

Figure 1:
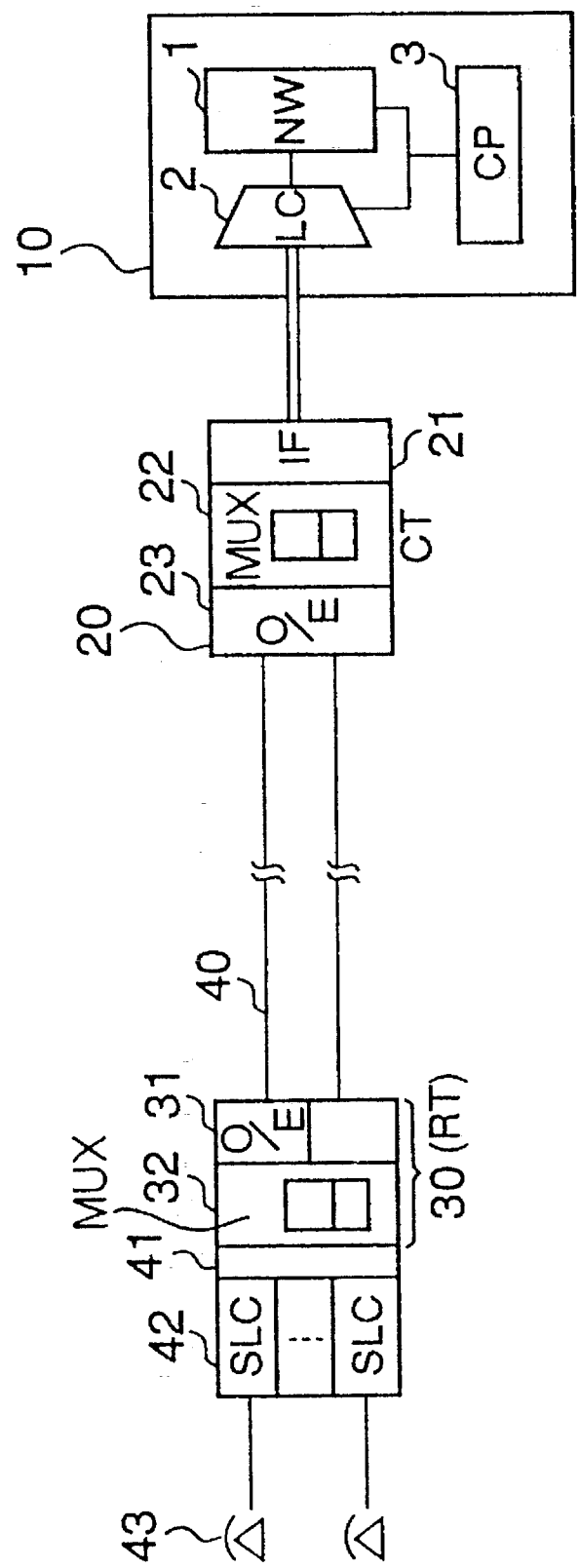
FIG. 1 is a block diagram illustrating a conventional remote subscriber control system.
Figure 2:
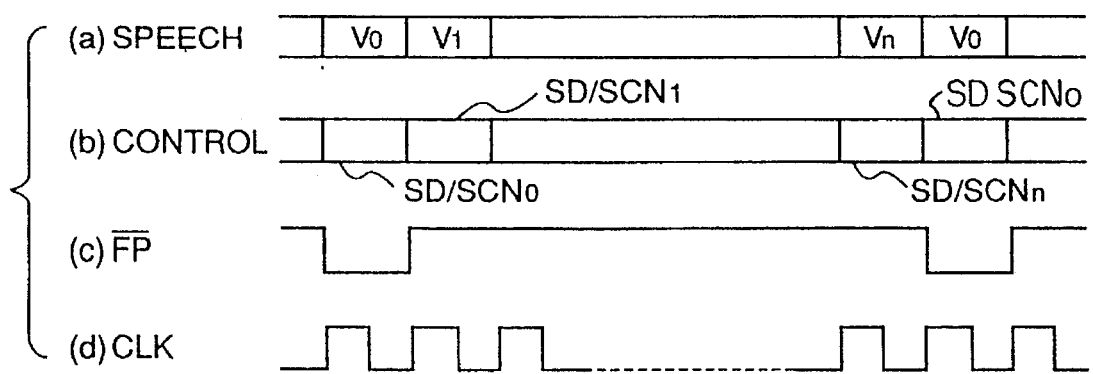
FIG. 2 is a diagram illustrating data to be transmitted via a transmission path and signals used for multiplexing the data, in the conventional system.
Figure 3:
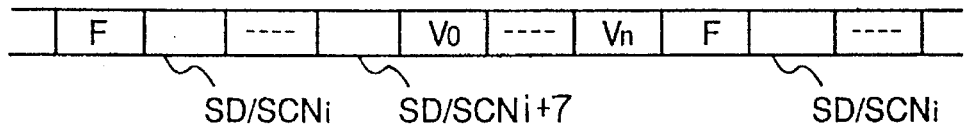
FIG. 3 is a diagram illustrating a format of a multiplexed signal transmitted in the conventional system.
Figure 4:
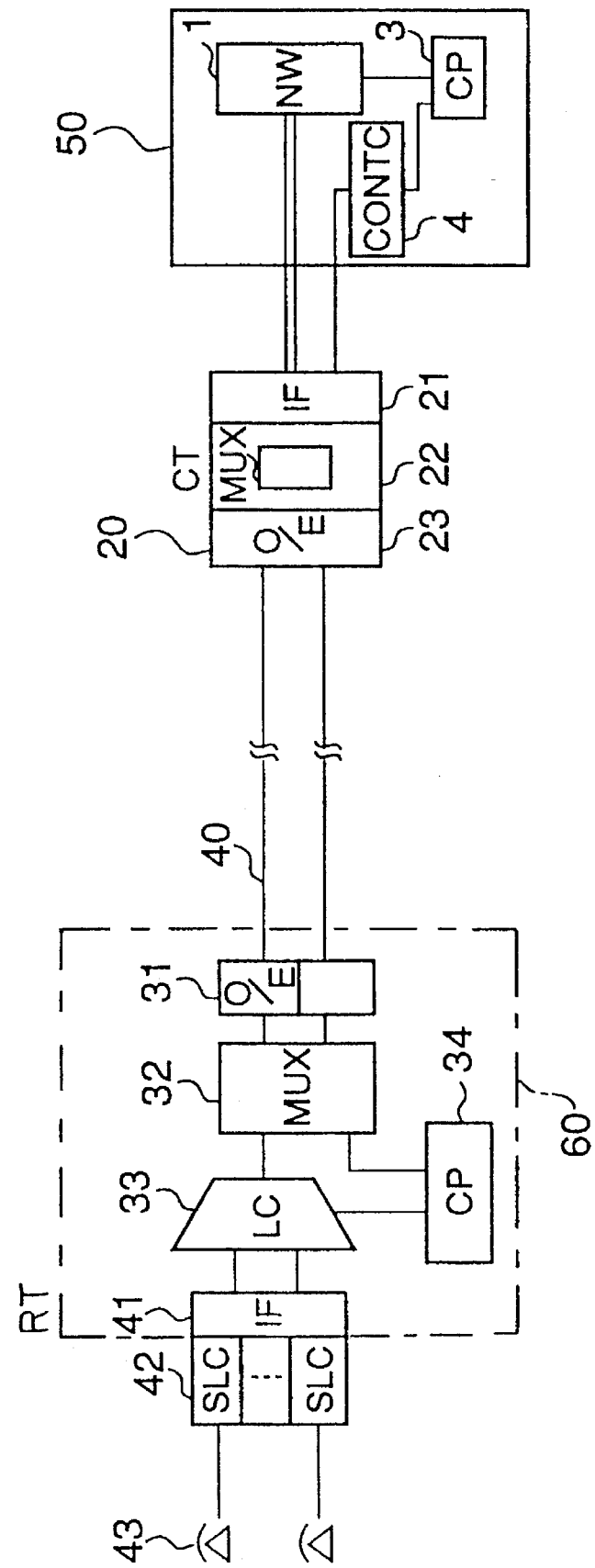
FIG. 4 is a block diagram illustrating another conventional remote subscriber control system.
Figure 5:
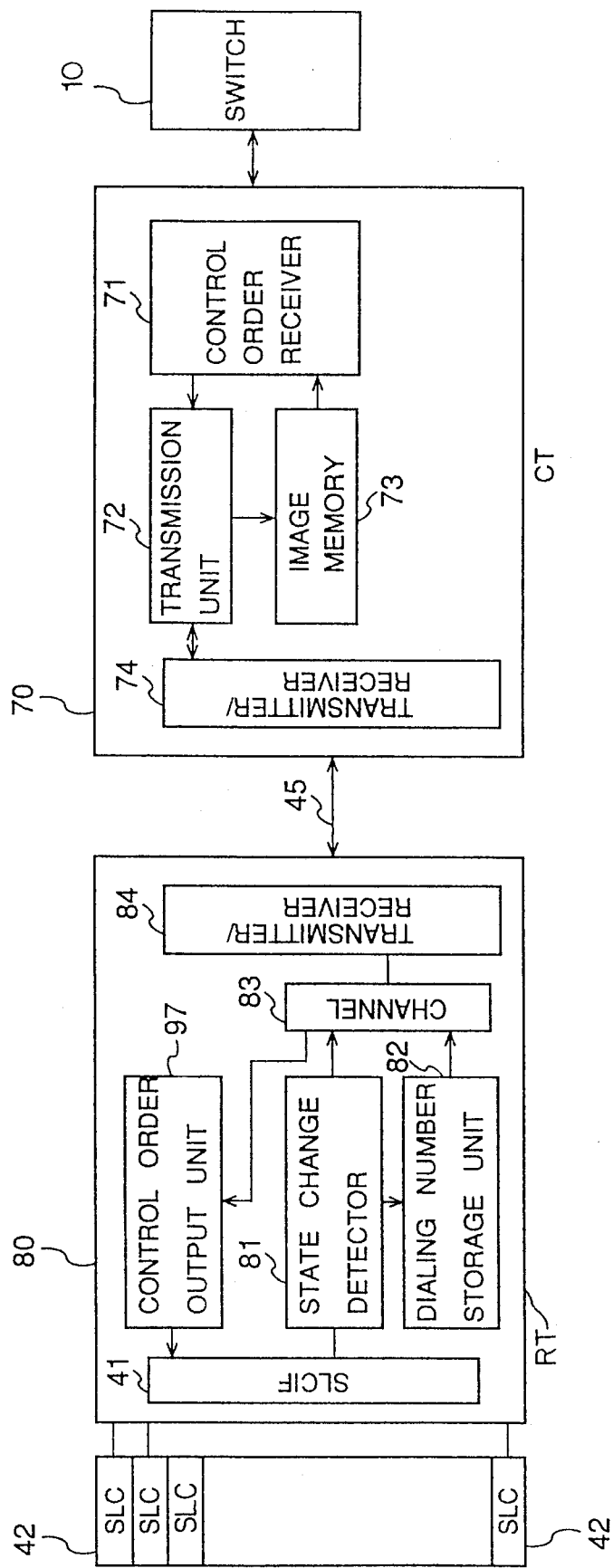
FIG. 5 is a block diagram illustrating an essential structure of a remote subscriber control system according to an embodiment of the present invention.

A description will now be given, with reference to FIG. 5, of the principle of an embodiment of the present invention. In FIG. 5, those parts which are the same as those shown in FIGS. 1 and 4 are given the same reference numbers.

In a remote subscriber control system shown in FIG. 5, a remote subscriber side transmitter (RT) 80 including the subscriber line interface (SLCIF) circuit 41 and a switch side transmitter (CT) 70 connected to the switch 10 are coupled to each other by a digital transmission path 45. Speech signals and control signals are multiplexed and transmitted via the digital transmission path 45 between the switch side transmitter 70 and the remote subscriber side transmitter 80. The remote subscriber side transmitter 80 is coupled to remote subscriber terminals (not shown) via the subscriber line interface circuits (SLC) 42.

The remote subscriber transmitter 80 is also provided with a state change detector 81, a dialing number storage unit 82, a channel unit 83, a transmitter/receiver 84 and a control order output unit 97. The state change detector 81 detects whether or not a state of each of remote subscriber terminals has changed. The dialing number storage unit 82 stores dialing numbers specifying the remote subscriber terminals. The channel unit 83 temporarily stores an address indicating a position corresponding to a remote subscriber terminal whose state has changed and stores the changed contents. The control order output unit 97 supplies control orders to the subscriber line interface circuit 41.

The switch side transmitter 70 is provided with a control order receiver 71, a transmission unit 72, an image memory 73 and a transmitter/receiver 74. The control order receiver 71 receives subscriber circuit control orders supplied from the switch 10. The transmission unit 72 successively stores the control orders and transmits them to the subscriber line interface 41. The image memory 73 stores subscriber information transmitted from the subscriber line interface circuit 41 in the same order in which they were received. Remote subscriber control signals are transmitted between the transmitter/receivers 74 and 83 independent of controlling operations of the processor for the switch 10.

Control orders from the switch 10 are supplied to transmission unit 72 via the control order receiver 71, and the control orders are supplied to the transmitter/receiver 74 in the same order in which they are to be transmitted. The control orders are then transmitted to transmitter 80. The subscriber state information is transmitted from transmitter 80 to transmitter 70 and is supplied to the image memory 73 via transmitter/receiver 74. The processor for the switch 10 carries out a switching control based on information stored in the image memory 73. The subscriber circuits 42 are controlled based on information stored in the image memory provided in the state change detector 81. In the transmission of information between transmitters 70 and 80 an autonomous transmission control is performed in accordance with a predetermined priority.

A detailed description will now be given of the embodiment.

Figure 6:
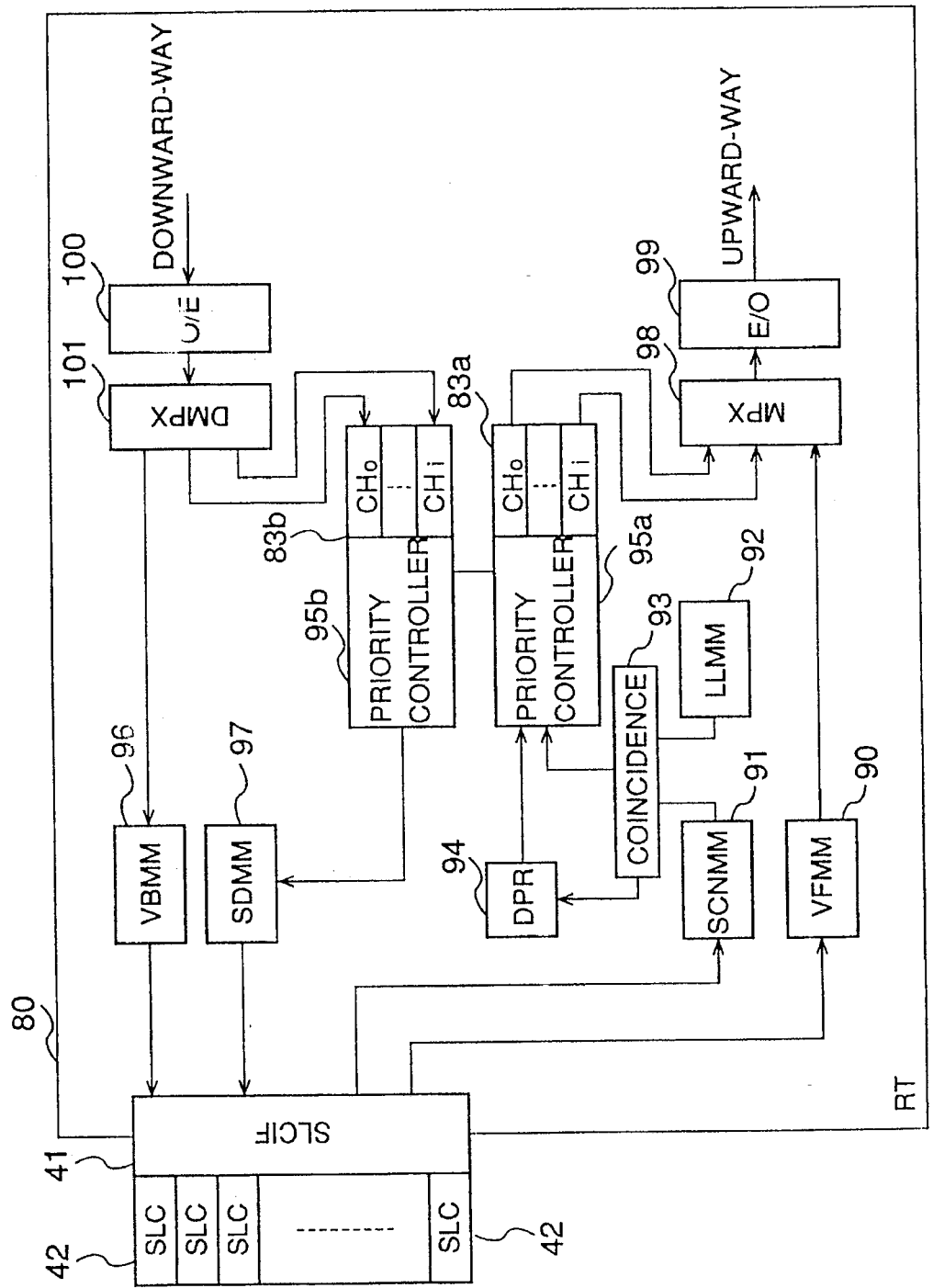
FIG. 6 is a block diagram illustrating an example of a remote subscriber side transmitter in the remote subscriber control system shown in FIG. 5.

FIG. 6 shows a detailed constitution of the remote subscriber side transmitter 80. Referring to FIG. 6, a voice memory 90 (VFMM), a first state information memory 91 (an SCNMM image memory), a second state information memory 92 (LLMM) and a coincidence detecting circuit 93 are provided in the remote subscriber side transmitter 80. The voice memory 90 stores speech signals supplied from the subscriber line interface circuit 41. The first state memory 91 stores subscriber state signals periodically supplied from the subscriber line interface circuit 41. The subscriber state signal indicates a state of each of the subscriber terminals (e.g. on-hook, off-hook, communicating and the like). The second state information memory 92 stores a subscriber state signal that has been supplied one period before. The coincidence detecting circuit (comparator) 93 compares a subscriber state signal stored in the first state information memory 91 with subscriber state signal stored in the second state information memory 92 and detects whether or not the subscriber state signals are equal to each other. A unit formed of the first and second state information memories 91 and 92 and the comparator 93 corresponds to the state change detector 81 shown in FIG. 5.

A dialing number storage unit 94 stores dialing numbers specifying each subscriber terminal in response to a detecting signal output from the coincidence detecting circuit or comparator 93. The dialing number storage unit 94 corresponds to the unit 82 shown in FIG. 5. A first channel unit 83a (CH0, ..., and CHi) stores state signals or control signals corresponding to the subscriber terminals. A priority controller 95a carries out a priority control of the first channel unit 83a. Due to the priority control, each of channels (CH0, ..., and CHi) in the first channel unit 83a is vested with a priority. A multiplexer (MPX) 98 multiplexes state signals supplied from the first channel unit 83a and the speech signals supplied from the voice memory 90. An optical converter (E/O) 99 converts multiplexed signals output from the multiplexer 98 into optical signals. The optical signals output from the optical converter 99 are supplied to a forward highway in the optical transmission path 45 (which is one of digital transmission paths).

An optical converter (O/E) 100 receives multiplexed optical signals transmitted via a backward highway in the optical transmission path 45, and converts them into electric signals. A demultiplexer 101 (DMPX) separates from each other speech signals and control signals included in the signals output from the optical converter 100. A second channel unit 83b stores the control signals supplied from the multiplexer 101. A priority controller 95b carries out a priority control of the second channel unit 83b. Due to the priority control, each of channels (CH0, ..., and CHi) in the second channel unit 83b is vested with a priority. A voice memory (VBMM) 96 stores speech signals supplied from the demultiplexer 101. A control memory (SDMM) 97 stores the control signals supplied from the second channels 83a via the priority controller 95b. The control signals are supplied, as control orders, from the control memory 97 to the subscriber line interface circuits 42 via the subscriber line interface circuit 41. The control memory 97 corresponds to the unit 97 shown in FIG. 5. A unit formed of the first and second channels 83a and 83b, the priority controllers 95a and 95b, the multiplexer 98, the optical converters 99 and 100 and the demultiplexer 101 corresponds to the transmitter/receiver 84 shown in FIG. 5.

Figure 7:
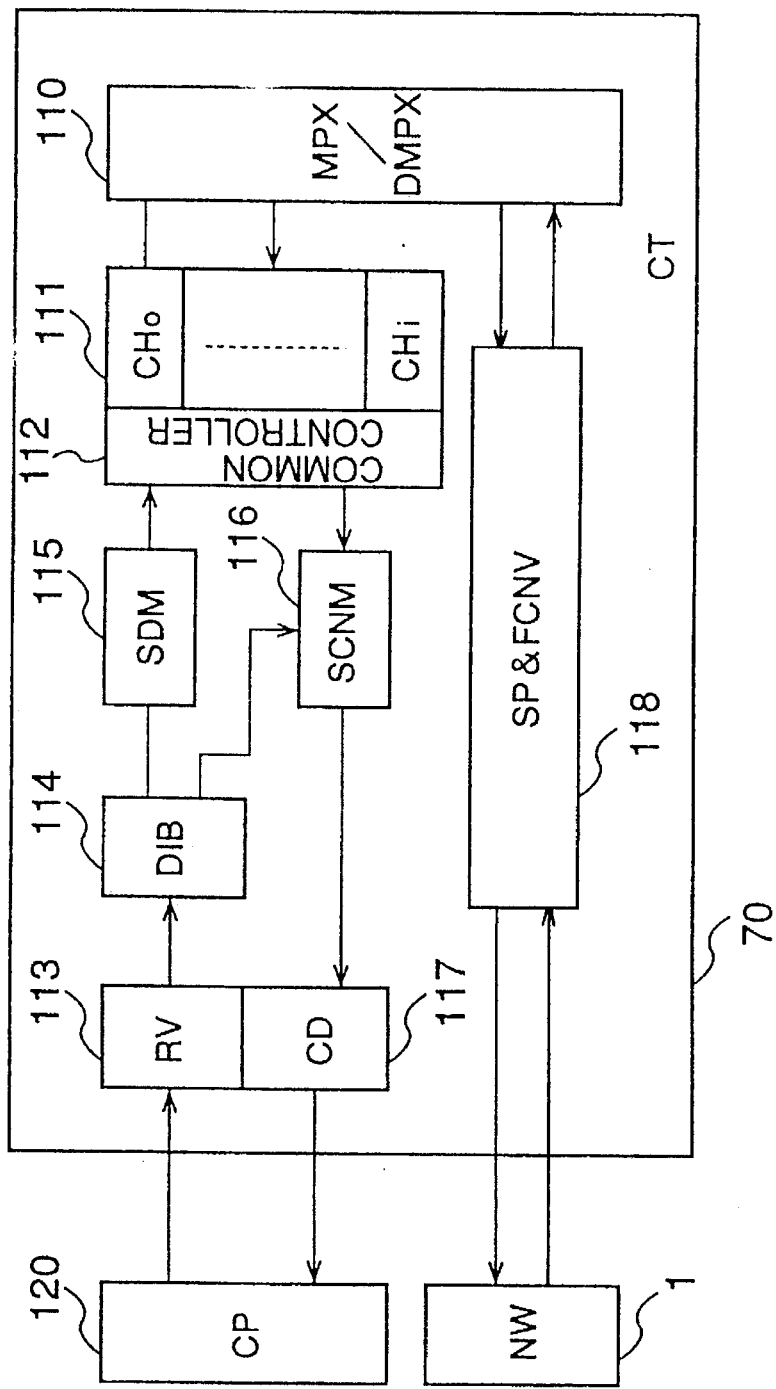
FIG. 7 is block diagram illustrating an example of a switch side transmitter in the remote subscriber control system shown in FIG. 5.

FIG. 7 shows the switch side transmitter 70. In the switch side transmitter 70 shown in FIG. 7, a multiplexer/demultiplexer 110 is connected to the optical transmission path 45 (not shown in FIG. 7) and multiplexes and demultiplexes signals. A channel unit 111 stores subscriber control signals or subscriber state signals. A common controller 112 selects channels in the channel unit 111. A unit formed of the multiplexer/demultiplexer 110, the channel unit 111 and the common controller corresponds to the transmitter/receiver 74 shown in FIG. 5. A speed/format converter 118 is provided between the multiplexer/demultiplexer 110 and the network switch 1. The speed/format converter 118 converts a transmission rate of the speech signal into another rate, and also converts a format of the transmission signals into another one.

A processor 120 is provided for controlling the network switch 1. An order receiver (RV) 113 receives control orders supplied from the processor 120. A distributor 114 distributes control orders supplied from the order receiver 113 to a control memory (SDM) 115 and a state information memory (SCNM) 116. The control memory 115 stores control orders distributed thereto by the distributor 114. The state information memory 116 stores state signals supplied from the common controller 112. The state signals stored in the state memory 116 are read out based on the control signals distributed by the distributor 114. A read unit 117 reads out state signals from the state information memory 116 and supplies them to the processor 120. A unit formed of distributor 114 and the control memory 115 corresponds to the second state information memory 92 shown in FIG. 6. A unit formed of the order receiver 113 and the read unit 117 corresponds to the control order receiver 71.

When all subscriber terminals are in an idle state (On-hook), both the state memory 92 in the remote subscriber side transmitter 80 shown in FIG. 6 and the state memory 116 in the switch side transmitter 70 shown in FIG. 7 have stored the idle state information. When an off-hook operation of a subscriber terminal is carried out, a corresponding one of the subscriber line interface circuits 42 outputs off-hook information. The off-hook information is supplied to the state information memory 91 via the subscriber line interface circuit 41 and is stored therein. The coincidence detecting circuit 93 periodically compares the contents of the state information memories 91 and 92. When the coincidence detecting circuit 93 detects that the contents (the idle state information and the off-hook information) of the state information memories 91 and 92 differ from each other, the coincidence detecting circuit or comparator 93 moves the content (the off-hook information) of the state information memory 91 to the state information memory 92. The coincidence detecting circuit 93 transmits a changed address specifying the subscriber terminal in which the off-hook operation is being performed and transmits the off-hook information (changed information) to the priority controller 95a.

The priority controller 95a selects empty transmission channels in the first channel unit 83a in order of receipt of the changed address and the changed information. The changed address and the changed information are stored in the selected transmission channel in the channel unit 83a. The information read out from the channel unit 83a and the speech signals stored in the voice memory 90 are multiplexed by the multiplexer 98. The multiplexed signals are supplied to the optical transmission path 45 via the optical converter 99, and transmitted to the switch side transmitter 70 via the optical transmission path 45. In this case, the speech signals are supplied from the subscriber terminal, in which the off-hook operation took place, to the voice memory 90 via a corresponding one of the subscriber line interface circuits 42 and the subscriber line interface circuit 41. The speech signals are transmitted in predetermined time slots so that the speech signals and the information supplied from the selected transmission channel CHi are multiplexed in the optical transmission path 45.

Figure 8:
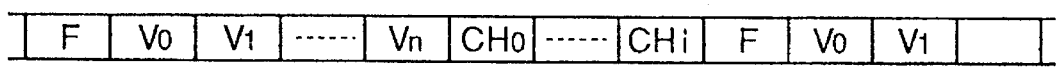
FIG. 8 is a diagram illustrating a format of a multiplexed signal transmitted in the remote subscriber control system according to the embodiment of the present invention.

FIG. 8 shows a format of signals transmitted via the optical transmission path 45. Referring to FIG. 8, a frame pattern F, speech signals V0 through Vn and subscriber state signals (including the changed address and changed information) CH0 through CHi are successively arranged. In the conventional system, the speech signals must have a one-to-one correspondence with the control signals in the optical transmission path 45. However, in the system of this embodiment, only when the state of the subscriber terminals is changed, the control signals (subscriber state signals) are transmitted, using time slots for the control signals. In addition, the time slots for the speech signals and the time slots for the control signals can be independently set up.

In the switch side transmitter 70 shown in FIG. 7, the optical converter (not shown in FIG. 7) receives the above multiplexed signals transmitted from the remote subscriber side transmitter 70 via the optical transmission path 45. The multiplexed signal converted by the optical converter is supplied to the multiplexer/demultiplexer 110, the multiplexer/demultiplexer 110 demultiplexes the multiplexed signal so that the speech signals and the subscriber state signals are separated from each other. The speech signals are supplied from the multiplexer/demultiplexer 110 to the speed/format converter 118. The speech signals are processed by the speed/format converter 118 so that transmission rate and format are adjusted to a rate and format suitable for a network of the switch 1. The speech signals processed by the speed/format converter 118 are supplied to the network switch 1.

The subscriber state signals separated from the speech signals by the multiplexer/demultiplexer 110 are supplied to channels in the channel unit 111. In a case where effective state information (e.g. the off-hook information) is included in the subscriber state signals, the state information (the off-hook information) is written in the state information memory 116 (an image memory) so as to correspond to the changed address. The processor 120 for the switch 1 periodically reads out the information in the state information memory 116. That is, the processor 120 periodically accesses the state information memory 116 via the order receiver 113 and distributor, and thus, the state information (the subscriber information) stored in the state memory 116 is read out by the read unit 117 and supplied to the processor 120.

When the processor 120 determines that the state information read out from the state memory 116 has changed, the processor 120 detects a state of the subscriber terminal. In this case, as the off-hook information is stored in the state memory 116, the processor 120 detects a call-out of the subscriber terminal. Then, a switch 1 connects a path for the calling subscriber terminal to a signal unit (not shown in FIG. 7) for generating a dialing tone, and the dialing tone signal is returned, in time slots for the speech signals, to the calling subscriber terminal.

The processor 120 outputs a control order for setting a speech pattern. The control order is received by the order receiver 113 and supplied to the control memory 115 via the distributor 114, so that the control order is stored in the control memory 115. When the control order is received by the control memory 115, the common controller 112 is activated. Then, the common controller 112 writes the control order stored in the control memory 115 into a channel of the channel unit 111. The multiplexer/demultiplexer 110 multiplexes the control order supplied from the channel unit 111 and the speech signals supplied from the speed/format converter 118, and the multiplexed signals are output to the optical transmission path 45. The multiplexed signals are then transmitted to the remote subscriber side transmitter 80 via the optical transmission path 45.

In the remote subscriber side transmitter 80, the received signals are converted into electric signals by the optical converter 100. The demultiplexer 101 demultiplexes the signals supplied from the optical converter 100 so that the speech signals including the dialing tone signals and the control order are separated from each other. The control order output from the demultiplexer 101 is stored in the channel of the channel unit 83b. The speech signals are stored in the voice memory 96. The priority controller 95b reads out the control order from the channel of the channel unit 111 and writes it in a specified address of the control memory 97. The control order is supplied to the subscriber line interface circuits 42 via the subscriber line interface circuit 41, and the control order pattern is written in the subscriber line interface circuits 42. At this time, the dial tone signal is supplied from the voice memory 96 to the off-hook subscriber terminal via the subscriber line interface circuit 41 and a corresponding one of the subscriber line interface circuits 42.

A user of the calling subscriber terminal hears a dialing tone, and carries out an input operation of a dialing number.

A state where the input operation of the dialing number is carried out is detected by the coincidence detecting circuit 93. The dialing number is stored in the dialing number storage unit 94. The dialing number stored in the dialing number storage unit 94 is written in the channel unit 83a by the priority controller 95a. The dialing number stored in the channel unit 83a is read out therefrom, and is multiplexed by the multiplexer 98. The multiplexed signal is supplied to the optical transmission path 45 via the optical converter 99.

In the switch side transmitter 70, when the signal including the dialing number is received, the dialing number is separated from other control signals by the multiplexer/demultiplexer 110. The dialing number is temporarily stored in the channel unit 111. The common controller 112 reads out the dialing number from the channel unit 111. The dialing number supplied from the common controller 112 is written in the state memory 116. The processor 120 periodically accesses the state memory 116, and reads out the dialing number. The processor 120 controls the network switch 1 so that the path for the calling subscriber terminal is connected to another terminal specified by the dialing number.

According to the above embodiment, only when the state of the subscriber channels is changed, the state information is supplied, as the control signals to the optical transmission path 45. Thus, the time slots for the control signals are effectively used in the optical transmission path 45. In addition, the same information is always stored in both the switch side transmitter 70 and in the remote subscriber side transmitter 80. When the state of the subscriber terminal is changed, the state information in both the switch side transmitter 70 and in the remote subscriber side transmitter 80 is controlled by hardware. Thus, the subscriber terminals are effectively controlled.

Figure 9:
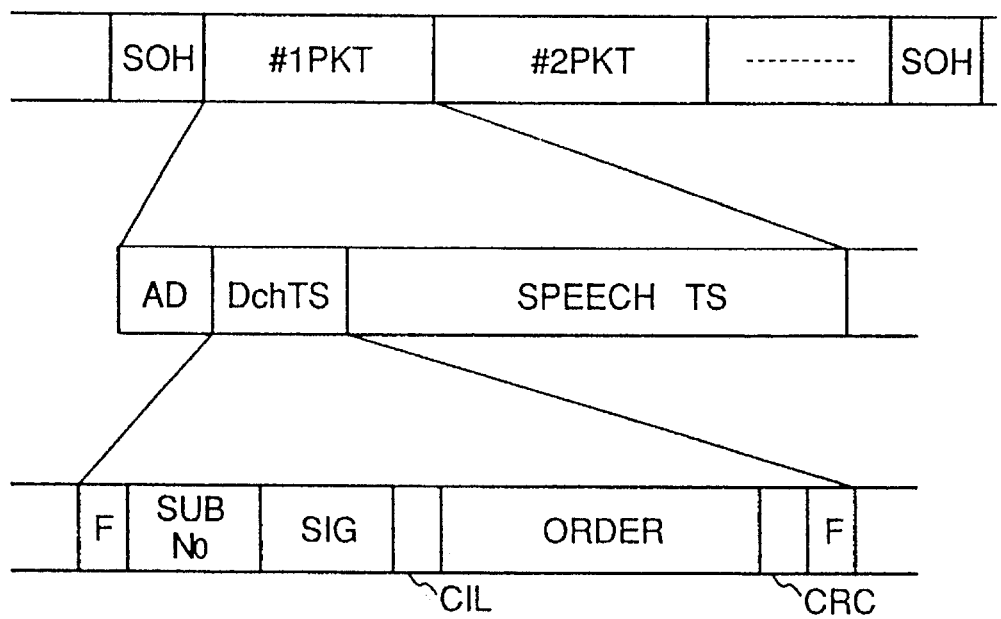
FIG. 9 is a diagram illustrating a transmission format used in the embodiment of the present invention.

FIG. 9 shows a data transmission format used in the above system according to the embodiment of the present invention. Referring to FIG. 9, a header SOH and packets #1PKT, #2PKT, . . . are successively arranged. Each of the packets is formed of an address AD, a time slot DchTS for a signal channel and a speech time slot TS. The time slot DchTS is formed of a frame head F, a sub number, an address portion including SIG and CIL type of a signal and a control order portion CRC. "CIL" means "indicator of sending, receiving and response for packet data"; "SIG" means "Signal Indicator Sign Bits" and "CRC" means "Cyclic Redundancy Check Code".

Figure 10:
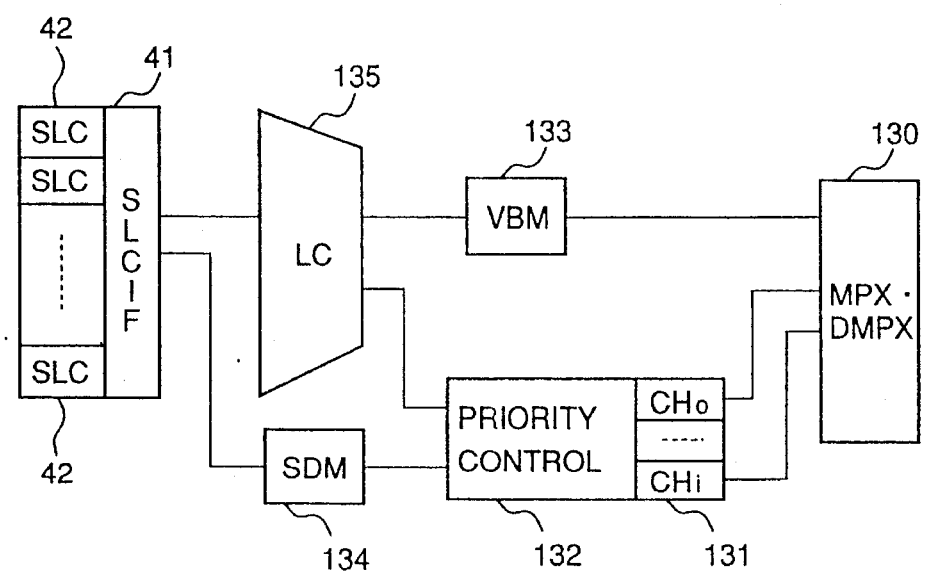
FIG. 10 is a block diagram illustrating another example of the remote subscriber side transmitter.

FIG. 10 shows another example of the remote subscriber side transmitter 80. In FIG. 10, those parts which are the same as those shown in FIG. 6 are given the same reference numbers. This remote subscriber side transmitter 80 is provided with a line concentrator.

Referring to FIG. 10, a multiplexer/demultiplexer 130 is connected to an optical converter (not shown in FIG. 10). A channel unit 131 stores control signals or state signals. A priority controller 132 controls the channel unit 131 so that unused channels of the channel unit 131 are vested with signals in accordance with a priority thereof. A voice memory (VBM) 133 stores speech signals. A memory 134 stores control signals or state signals. A line concentrator 135 is connected to the subscriber line interface 41.

Control orders for the line concentrator 135 are output from the processor 120 shown in FIG. 7 and transmitted to the remote subscriber side transmitter 80 via the optical transmission path 45, in the same manner as the control orders for the subscriber line interface circuits 42. The control orders are received by the multiplexer/demultiplexer 130. The control order is supplied from the multiplexer/demultiplexer 130 to the line concentrator via the priority controller 132. In this case, the priority controller 132 determines whether the subscriber line interface circuits 42 or the line concentrator 135 should be controlled based on the control order.

According to the embodiment shown in FIG. 10, as the speech signals are supplied to the subscriber line interface circuits 42 via the line concentrator 135, the number of time slots for transmitting the speech signals can be decreased.

In addition, if, in the common controller 112 and the priority controller 95, the transmission controls are performed in order of receipt of control orders, the subscriber control can be sequentially performed.

In a case where the state information and the control order are transmitted by use of a plurality of channels, if arbitrary unused channels are used, the sequence of control operations can be disturbed. To prevent this, the control orders are vested with priority values generated in the priority controller 132; thus a plurality of the channels are effectively use.

In a case where the control order output from the processor 120 is divided into first and second orders, another control order can be transmitted between transmissions of the first and second orders. In this case, after the switch side transmitter 70 determines that both the first and second orders have been received, the common controller 112 is requested to transmit the control order comprising the first and second orders.

In the above embodiment, control channels separate from each other are used for transmission and reception. However, response signals must be transmitted in response to each control order. For this purpose, the control data is provided with a transmission response control bit and a reception response control bit. Due to the use of the transmission response bit and the reception response control bit, the transmission of the control data and the reception of the control data can be performed via the same channel.

Figure 11:
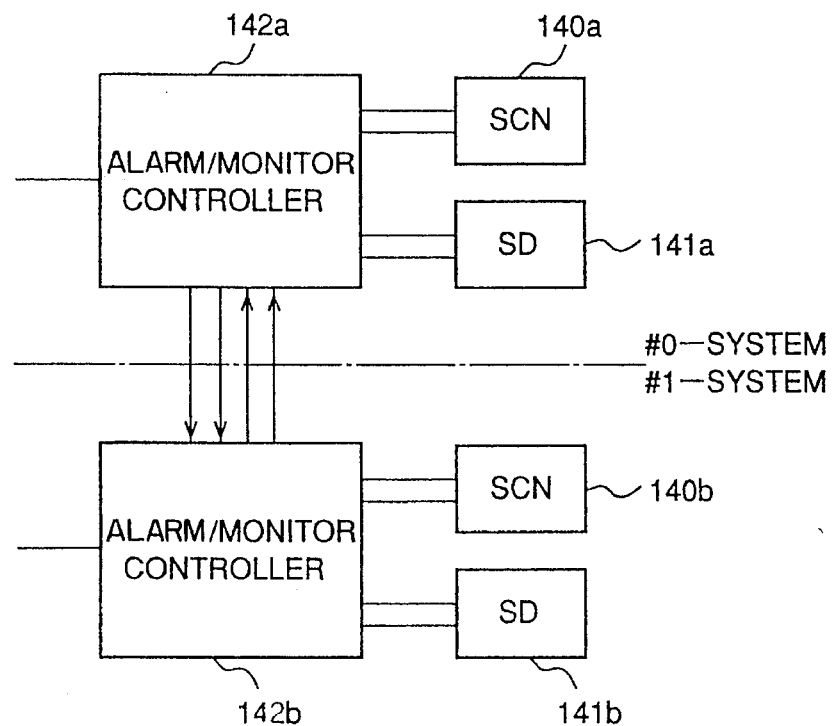
FIG. 11 is a block diagram illustrating another example of the remote subscriber side transmitter.

FIG. 11 shows another example of the remote subscriber side transmitter 80.

In this example shown in FIG. 11, the image memory is duplicated to a #0-system and a #1-system. In the #0-system, a state memory unit 140a includes a state memory (SCN) and a controller for the state memory; a control memory unit 141a includes a control memory (SD) and a controller for the control memory. The state memory unit 140a and the control memory unit 141a form the image memory. The state memory unit 140a and the control memory unit 141a are connected to an alarm/monitor controller 142. The alarm/monitor controller 142 controls both the state memory unit 140a and the control memory unit 141a, and detects extraordinary failures of those memory units. The #1-system is made up of a state memory unit 140b, a control memory unit 141b and the alarm/monitor controller 142b in the same manner as the #0-system. The alarm/monitor controllers 142a and 142b in both the #0-system and #1-system are cross-connected to each other so that signals are mutually supplied to the alarm/monitor controllers 142a and 142b.

In this example, when both the alarm/monitor controllers 142a and 142b determine that data stored in the image memories of the #0-system and the #1-system are the same as each other, the data is transmitted, as normal data, to the subscriber line interface circuits 42 and or the switch side transmitter 80. When one of the alarm/monitor controllers 142a and 142b of the #0-system and the #1-system detects an extraordinary failure of the image memory, one of the alarm/monitor controllers 142a and 142b informs another controller that the extraordinary failure has occurred in the image memory. Then, only the normal system (#0 or #1) proceeds with processing.

Figure 12:
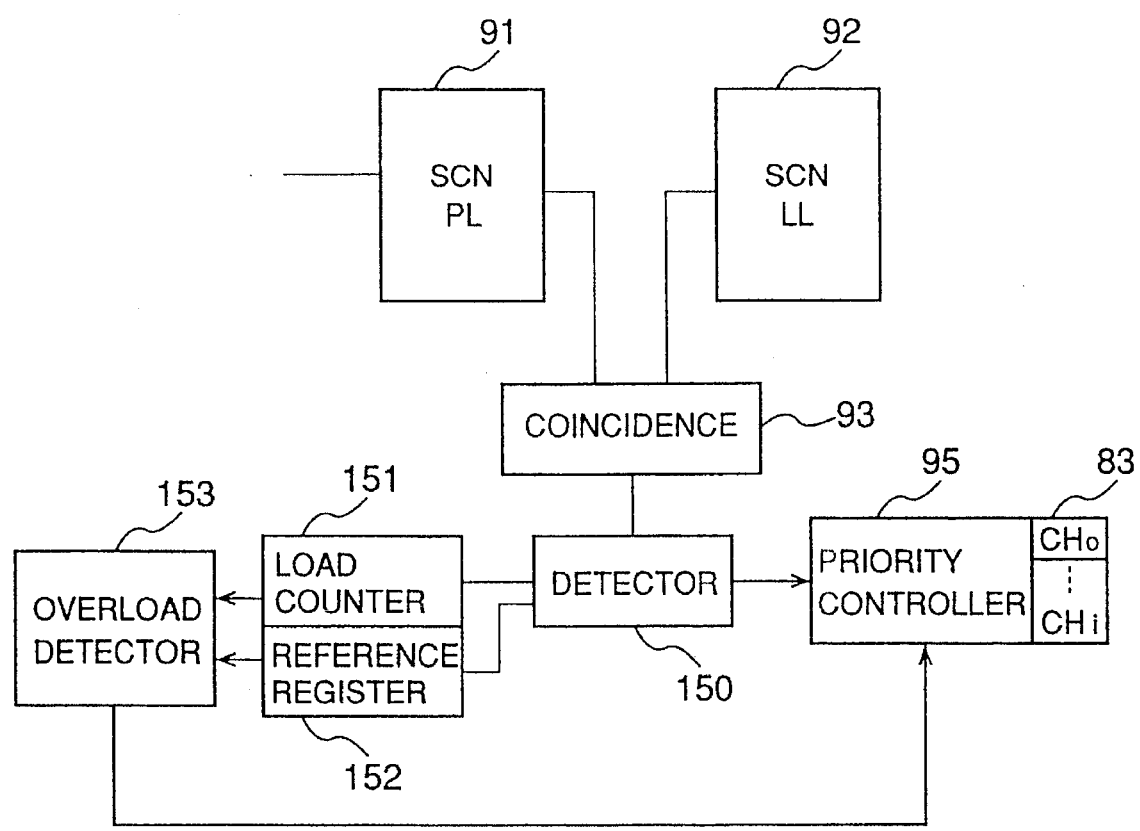
FIG. 12 is a block diagram illustrating another example of the remote subscriber side transmitter.

FIG. 12 shows another example of the remote subscriber side transmitter 80. In FIG. 12, those parts which are the same as those shown in FIG. 6 are given the same reference numbers.

Referring to FIG. 12, the state memory 91 (SCNPL) periodically stores state signals supplied from the subscriber terminals. The state memory 92 (SCNLL) stores state signals which have been supplied one period before. The coincidence detecting circuit 93 detects whether or not the state signals have changed. A calling detector 150 detects a call based on the output of the coincidence detecting circuit 93. A load counter 151 counts the number of calls. A reference number of calls occurring within a predetermined time is stored in the reference register 152. An overload detector 153 compares the count value of the load counter 151 with the reference number stored in the reference register 152, and detects overload based on the comparison result. The detecting result obtained by the overload detector 153 is supplied to the priority controller 95.

In the above circuit, when the coincidence detecting circuit 93 detects that the state signal is changed, the state signal stored in the state memory 91 is written in an unused channel of the channel unit 83 via the priority controller 95. At this time, the calling detector 150 detects a call based on the output of the coincidence detecting circuit 93. The load counter 151 is then incremented by one. When the count value of the load counter 151 exceeds the reference number stored in the reference register 152, the overload detector 153 detects an overload. The detection results of the overload detector 153 is supplied to the priority controller 95. The priority controller 95 controls the channel units 83 so that transmission of information is interrupted.

According to this example, the amount of load in the system can be controlled without control by the processor 120 for the network switch 1. The overload information can be transmitted to the processor 120 for the network switch 1.

The present invention is not limited to the aforementioned embodiments, and variations and modifications may be made without departing from the scope of the claimed invention.

What is claimed is:

1. A remote subscriber control system, provided between a switching system having a processor and a subscriber line interface circuit coupled to a plurality of remote subscriber terminals, for controlling communications between said remote subscriber terminals and said switching system, said remote subscriber control system comprising a remote subscriber side transmitter coupled to said subscriber line interface circuit, a switch side transmitter coupled to said switching system, and a digital transmission path connecting said remote subscriber side transmitter to said switch side transmitter so that multiplexed signals including speech signals and control signals are transmitted through said digital transmission path, wherein said remote subscriber side transmitter comprises:

state change detection means for detecting which remote subscriber terminal of said remote subscriber terminals has changed a state thereof and outputting a detection signal;

state storage means for storing state information indicating a state of each remote subscriber terminal;

dialing number storage means for storing a dialing number specifying a called terminal in response to the detection signal output from said state charge detection means; and first transmitter/receiver means; and wherein said switch side transmitter comprises:

control order receiving means for receiving control orders from said switching system;

said first transmitter/receiver means transmitting state information stored in said state storage means, as subscriber control information, and the dialing number stored in said dialing number storage means, to said switch side transmitter via said digital transmission path and receiving said control orders supplied from said switch side transmitter via said digital transmission path, each control order being information for controlling one of said remote subscriber terminals;

said remote subscriber side transmitter further comprising:

order output means for outputting a control order, received by said first transmitter/receiver means, to said subscriber line interface circuit;

said switch side transmitter further comprising:

output means for storing control orders received by said control order receiving means and for outputting the control orders in the same order in which the control orders were received by said order receiving means;

second transmitter/receiver means for transmitting the control orders, outputted from said output means, to said remote subscriber side transmitter via said digital transmission path and for receiving subscriber control information and the dialing number, supplied from said remote subscriber side transmitter via said digital transmission path; and storage means for storing subscriber control information and the dialing number received by said second transmitter/receiver means, the subscriber control information and said dialing number stored being supplied to said processor of said switching system, said processor generating control orders based on said subscriber control information and said dialing number.

2. The remote subscriber control system as claimed in claim 1, wherein said remote subscriber side transmitter further comprises a line concentrator provided between said subscriber line interface circuit and said first transmitter/receiver means.

3. The remote subscriber control system as claimed in claim 1, wherein said order output means of said remote subscriber side transmitter has priority control means for outputting control orders in the same order in which the control orders were received by said first transmitter/receiver means.

4. The remote subscriber control system as claimed in claim 3, wherein said digital transmission path is provided with a plurality of channels through which control orders are to be transmitted, and wherein said priority control means generates a number specifying a control order which corresponds to a corresponding one of the channels, the control order specified by the number being transmitted via the corresponding one of the channels.

5. The remote subscriber control system as claimed in claim 1, wherein a control order transmitted from the processor of said switching system is divided into a plurality of unit orders, and wherein, after said order receiving means receives a last unit order, the unit orders are temporarily stored in said output means and are assembled into the control order, and thereafter the control order made up of all the unit orders is transmitted.

6. The remote subscriber control system as claimed in claim 1, wherein in transmission and receiving of information between said remote subscriber side transmitter and said switch side transmitter, the information has a transmission response control bit indicating that a channel is used for the transmission of the information and a receiving response control bit indicating that the channel is used for receiving of the information, so that the channel may be formed for the transmission and receiving of the information.

7. The remote subscriber control system as claimed in claim 1, wherein said remote subscriber side transmitter includes a first system and a second system each being provided with said state storage means, and wherein the information is transmitted from said remote subscriber side transmitter only when the information stored in said state storage means of said first system is identical to the information stored in said state storage means of said second system.

8. The remote subscriber control system as claimed in claim 1, wherein said remote subscriber side transmitter includes load detecting means for detecting whether or not a channel, used in the digital transmission path through which the control information is transmitted, is overloaded, and when said load detecting means detects that the channel is overloaded, transmission of the control information using the channel is interrupted.

9. The remote subscriber control system as claimed in claim 8, wherein said load detecting means includes first means for counting a number of calls to be transmitted within a predetermined time period, and second means for determining whether or not the number of calls counted by said first means exceeds a predetermined reference number, and wherein when said second means determines that the number of calls exceeds the predetermined reference number, said load detecting means detects that the channel is overloaded.

10. A remote subscriber control system as claimed in claim 1, wherein said digital transmission path is formed of an optical transmission path.

* * * * *